US012634865B2

(12) United States Patent
Sundararajan et al.

(10) Patent No.: US 12,634,865 B2
(45) Date of Patent: May 19, 2026

(54) REPORTING MEASUREMENT DISTRIBUTION FOR POSITIONING

(71) Applicant: QUALCOMM Incorporated, San Diego, CA (US)

(72) Inventors: Jay Kumar Sundararajan, San Diego, CA (US); Alexandros Manolakos, Escondido, CA (US); Naga Bhushan, San Diego, CA (US); Taesang Yoo, San Diego, CA (US); Krishna Kiran Mukkavilli, San Diego, CA (US); Weimin Duan, San Diego, CA (US); Sooryanarayanan Gopalakrishnan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/390,921

(22) Filed: Jul. 31, 2021

(65) Prior Publication Data

US 2022/0061014 A1     Feb. 24, 2022

Related U.S. Application Data

(60) Provisional application No. 63/068,188, filed on Aug. 20, 2020.

(51) Int. Cl.
*H04W 64/00*          (2009.01)

(52) U.S. Cl.
CPC ................................... *H04W 64/00* (2013.01)

(58) Field of Classification Search
CPC ..................................................... H04W 64/00
See application file for complete search history.

(56) References Cited

U.S. PATENT DOCUMENTS

| | | | |
|---|---|---|---|
| 2007/0207816 A1 | 9/2007 | Spain | |
| 2012/0113837 A1* | 5/2012 | Siomina ................ | H04W 24/10 |
| | | | 370/252 |
| 2013/0163448 A1 | 6/2013 | Ruuska | |
| 2019/0138904 A1* | 5/2019 | Millius ................. | G06F 40/216 |
| 2019/0182614 A1 | 6/2019 | Monogioudis et al. | |
| 2019/0362237 A1* | 11/2019 | Choi ...................... | G06N 3/044 |

(Continued)

FOREIGN PATENT DOCUMENTS

| | | | |
|---|---|---|---|
| CN | 101489180 A | | 7/2009 |
| CN | 107360542 A | * | 11/2017 |

(Continued)

OTHER PUBLICATIONS

International Search Report and Written Opinion—PCT/US2021/044104—ISA/EPO—Nov. 25, 2021.

*Primary Examiner* — Muthuswamy G Manoharan
(74) *Attorney, Agent, or Firm* — QUALCOMM Incorporated

(57) ABSTRACT

Techniques are provided for determining a position of a mobile device. An example method of reporting a probability distribution for positioning a mobile device includes obtaining positioning measurements, determining one or more probability distributions of one or more positioning metrics based on the positioning measurements, determining a parametric representation of the one or more probability distributions, and reporting the parametric representation.

24 Claims, 10 Drawing Sheets

(56) References Cited

U.S. PATENT DOCUMENTS

| | | | |
|---|---|---|---|
| 2020/0182959 A1* | 6/2020 | Markhovsky | G01S 19/05 |
| 2020/0217918 A1 | 7/2020 | Rydén et al. | |
| 2020/0267502 A1* | 8/2020 | Lee | H04W 4/44 |
| 2021/0160712 A1* | 5/2021 | Tadayon | H04L 1/0003 |
| 2022/0321164 A1* | 10/2022 | D'Andrea | H04B 1/71637 |
| 2023/0016595 A1* | 1/2023 | Rydén | H04W 36/0083 |
| 2023/0043111 A1* | 2/2023 | Zhuang | G01S 5/021 |
| 2023/0046671 A1* | 2/2023 | Zhang | H04W 64/00 |
| 2023/0276264 A1* | 8/2023 | Soldati | H04W 36/0055 |
| | | | 455/422.1 |

FOREIGN PATENT DOCUMENTS

| | | | | |
|---|---|---|---|---|
| EP | 2733980 A1 * | 5/2014 | | H04W 24/00 |
| GB | 201709747 D0 | 8/2017 | | |
| GB | 2563825 A | 1/2019 | | |

* cited by examiner

1000

1002
Obtain positioning measurements

1004
Determine one or more probability distributions of one or more positioning metrics based on the positioning measurements 1006
Determine a parametric representation of the one or more probability distributions 1008
Report the parametric representation

REPORTING MEASUREMENT DISTRIBUTION FOR POSITIONING

CROSS-REFERENCE TO RELATED APPLICATIONS

This application claims the benefit of U.S. Provisional Application No. 63/068,188, filed Aug. 20, 2020, entitled "REPORTING MEASUREMENT DISTRIBUTION FOR POSITIONING," the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth-generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. 5G networks, for example, will be deployed with larger bandwidths (BW), use higher frequencies such as millimeter wave (mmW) spectrum, have denser topologies and will use large antenna arrays enabling directional transmissions. These 5G networks are designed for both outdoor and indoor deployments and may support deployment by private entities other than cellular operators. Such network deployments are expected to provide high precision positioning based services. Improvements in the positioning messages transmitted between base stations and mobile device may be used to increase the accuracy of positioning estimates computed by network resources or the mobile device.

SUMMARY

An example method of reporting a probability distribution for positioning a mobile device according to the disclosure includes obtaining positioning measurements, determining one or more probability distributions of one or more positioning metrics based on the positioning measurements, determining a parametric representation of the one or more probability distributions, and reporting the parametric representation.

Implementations of such a method may include one or more of the following features. Obtaining the positioning measurements may include receiving a positioning reference signal from a base station. The positioning measurements may be associated with a first arriving path or with a second or subsequently arriving path of the positioning reference signal. The positioning measurements may include at least one of a received signal strength indication (RSSI), a reference signal received power (RSRP), a reference signal received quality (RSRQ) and round trip signal propagation time (RTT). The positioning metrics may include at least one of a time of arrival (TOA), a difference between a time of reception of a first positioning reference signal and a time of transmission of a second positioning reference signal, angle of arrival (AOA), and an angle of departure (AOD). Obtaining the positioning measurements may include receiving positioning reference signals from a plurality of base stations. The positioning measurements may be associated with a first arriving path or with a second or subsequently arriving path for each of the positioning reference signals. The positioning metrics may include at least one of reference signal time difference (RSTD). The probability distribution may be based at least in part on a Gaussian distribution and reporting the one or more probability distributions may include reporting a list of means, a list of standard deviations, a list of mixture weights corresponding to different Gaussians in a Gaussian mixture. The probability distribution may be based on a probability mass function (PMF) over a discrete set of bin ranges and reporting the one or more probability distributions includes reporting a probability of a metric value falling within a bin range. The discrete set of bin ranges may include uniform bin sizes or non-uniform bin sizes. The probability distribution may be based on a set of percentile values for a pre-defined set of percentiles and reporting the one or more probability distributions includes reporting a uniformly spaced set of percentiles or a non-uniformly spaced set of percentiles. The probability distribution may be based on a neural network and reporting the one or more probability distributions includes transmitting one or more weights of the neural network. Obtaining the positioning measurements may include receiving sounding reference signals from one or more mobile devices. The parametric representation is reported to a base station, a location server, and/or a mobile device. The parametric representation may include a confidence value associated with a LOS path. Obtaining the positioning measurements may include receiving a plurality of different positioning measurements and the probability distribution is a joint distribution based on the plurality of different positioning measurements. Obtaining the positioning measurements may include receiving a plurality of positioning measurements from a wireless node, and the probability distribution is a joint distribution of a plurality positioning metrics based on the plurality of positioning measurements. The plurality of positioning measurements may include a time of arrival and an angle of arrival for a positioning reference signal, and the joint distribution may be based on the time of arrival and the angle of arrival. Reporting the parametric representation may include transmitting the parametric representation in one or more radio resource control messages, LPP messages, or NPP messages. The method may include determining a position of the mobile device based at least in part on the one or more probability distributions. Obtaining the positioning measurements may include receiving a signal from at least one of an accelerometer, a gyroscope, and a barometer. The method may further include determining statistics associated with the one or more probability distributions, and reporting the statistics. The statistics may include one or more of a mean, a standard deviation, a percentile, and a confidence interval.

An example apparatus according to the disclosure includes a memory, at least one transceiver, at least one processor communicatively coupled to the memory and the at least one transceiver and configured to obtain positioning measurements, determine one or more probability distributions of one or more positioning metrics based on the positioning measurements, determine a parametric representation of the one or more probability distributions, and reporting the parametric representation.

Implementations of such an apparatus may include one or more of the following features. The at least one processor may be further configured to receive a positioning reference signal from a base station. The positioning measurements may be associated with a first arriving path or with a second or subsequently arriving path of the positioning reference signal. The positioning measurements may include at least one of a received signal strength indication (RSSI), a reference signal received power (RSRP), a reference signal received quality (RSRQ) and round trip signal propagation time (RTT). The positioning metrics include at least one of a time of arrival (TOA), a difference between a time of reception of a first positioning reference signal and a time of transmission of a second positioning reference signal, angle of arrival (AOA), and an angle of departure (AOD). The at least one processor may be further configured to receive positioning reference signals from a plurality of base stations. The positioning measurements may be associated with a first arriving path or with a second or subsequently arriving path for each of the positioning reference signals. The positioning metrics may include at least one of reference signal time difference (RSTD). The probability distribution may be based at least in part on a Gaussian distribution and the at least one processor may be configured to report a list of means, a list of standard deviations, a list of mixture weights corresponding to different Gaussians in a Gaussian mixture. The probability distribution may be based on a probability mass function (PMF) over a discrete set of bin ranges and the at least one processor may be configured to report a probability of a metric value falling within a bin range. The discrete set of bin ranges may include uniform bin sizes or non-uniform bin sizes. The probability distribution may be based on a set of percentile values for a pre-defined set of percentiles and the at least one processor may be configured to report a uniformly spaced set of percentiles or a non-uniformly spaced set of percentiles. The probability distribution may be based on a neural network and the at least one processor may be configured to transmit one or more weights of the neural network. The at least one processor may be configured to receive sounding reference signals from one or more mobile devices. The parametric representation may be reported to a base station, a location server, and/or a mobile device. The at least one processor may be configured to receive a plurality of different positioning measurements and the probability distribution may be a joint distribution based on the plurality of different positioning measurements. The at least one processor may be configured to receive a plurality of positioning measurements from a wireless node, and the probability distribution may be a joint distribution of a plurality positioning metrics based on the plurality of positioning measurements. The plurality of positioning measurements may include a time of arrival and an angle of arrival for a positioning reference signal, and the joint distribution may be based on the time of arrival and the angle of arrival. The at least one processor may be configured to transmit the parametric representation in one or more radio resource control messages, LPP messages, or NPP messages. The at least one processor may be configured to determine a position of the mobile device based at least in part on the one or more probability distributions. The at least one processor is configured to receive a signal from at least one of an accelerometer, a gyroscope, and a barometer. The at least one processor may be configured to determine statistics associated with the one or more probability distributions, and report the statistics. The statistics may include one or more of a mean, a standard deviation, a percentile, and a confidence interval.

An example apparatus for reporting a probability distribution for positioning a mobile device according to the disclosure includes means for obtaining positioning measurements, means for determining one or more probability distributions of one or more positioning metrics based on the positioning measurements, means for determining a parametric representation of the one or more probability distributions, and means for reporting the parametric representation.

An example non-transitory processor-readable storage medium comprising processor-readable instructions configured to cause one or more processors to report a probability distribution for positioning a mobile device according to the disclosure includes code for obtaining positioning measurements, determining one or more probability distributions of one or more positioning metrics based on the positioning measurements, determining a parametric representation of the one or more probability distributions, and reporting the parametric representation.

Items and/or techniques described herein may provide one or more of the following capabilities, as well as other capabilities not mentioned. A mobile device may obtain positioning measurements associated with one or more positioning reference signal metrics. The mobile device may determine one or more probability distributions based on the positioning measurements and report the probability distributions to a communications network. The probability distribution may be based on a neural network. The network may be configured to combine the reported probability distribution with other metrics using a likelihood fusion approach. The position of the mobile device may be estimated based on the probability distributions. The accuracy of a position estimate based on the probability distributions may be improved as compared to a position estimate based on reporting a single metric measurement value. Other capabilities may be provided and not every implementation according to the disclosure must provide any, let alone all, of the capabilities discussed.

DETAILED DESCRIPTION

Techniques are discussed herein for determining a position of a mobile device. For example, positioning methods in a communication network may include a plurality of wireless nodes, such as base stations configured to transmit one or more a reference signals, and one or more a user equipment (UEs) configured to measure and report measurement values based on pre-defined metrics such as reference-signal-received-power (RSRP), time-of-arrival (TOA), round-trip-time (RTT), reference signal time difference (RSTD) based on the transmitted reference signals. In some cases, however, the UE may not be able to obtain an accurate measurement of the metric. For example, if the line-of-sight (LOS) channel path is attenuated due to an obstruction, the UE may derive the TOA based on a non-line-of-sight (NLOS) path. Since the NLOS path will be longer than the LOS path, the resulting measurement may lead to an over-estimate of the distance between the base station and the UE. In such cases, the UE may utilize additional information to improve the accuracy of the signal measurement. In an embodiment, the UE may utilize the estimated channel response to derive a probability distribution of the measured quantity. For example, the UE may use the estimated channel response to estimate the timing of the first-arriving channel path (i.e., the time-of-arrival (TOA)). The UE may also be able to derive other estimates of the TOA along with a probability value indicating a confidence on that estimate.

The techniques provided herein enable a UE to report a probability distribution of a measured metric to a network entity. The UE may also report other derived statistics based on the measurement metric such as the confidence interval, variance, standard deviation, and the like. In an embodiment, the probability distribution of the positioning metric may be represented as a parametric function. The UE may be configured to report parameters of a functional representation of the distribution of the estimated metric to the network entity. In an embodiment, a base station may also be configured to indicate probability distributions of uplink-based metrics to the UE by reporting parameters of a functional representation of the distribution. As examples, and not limitations, the estimated positioning metrics may be time-of-arrival (TOA), reference signal time difference (RSTD), angle of arrival (AOA) or angle of departure (AOD). The distributions may optionally be a joint distribution of more than one metric (e.g., RSTD and AOD). The UE or network entity may be configured to report statistics derived from the distribution, such as the mean, standard deviation, percentiles, confidence interval, etc. to the network entity or UE.

Figure 1:
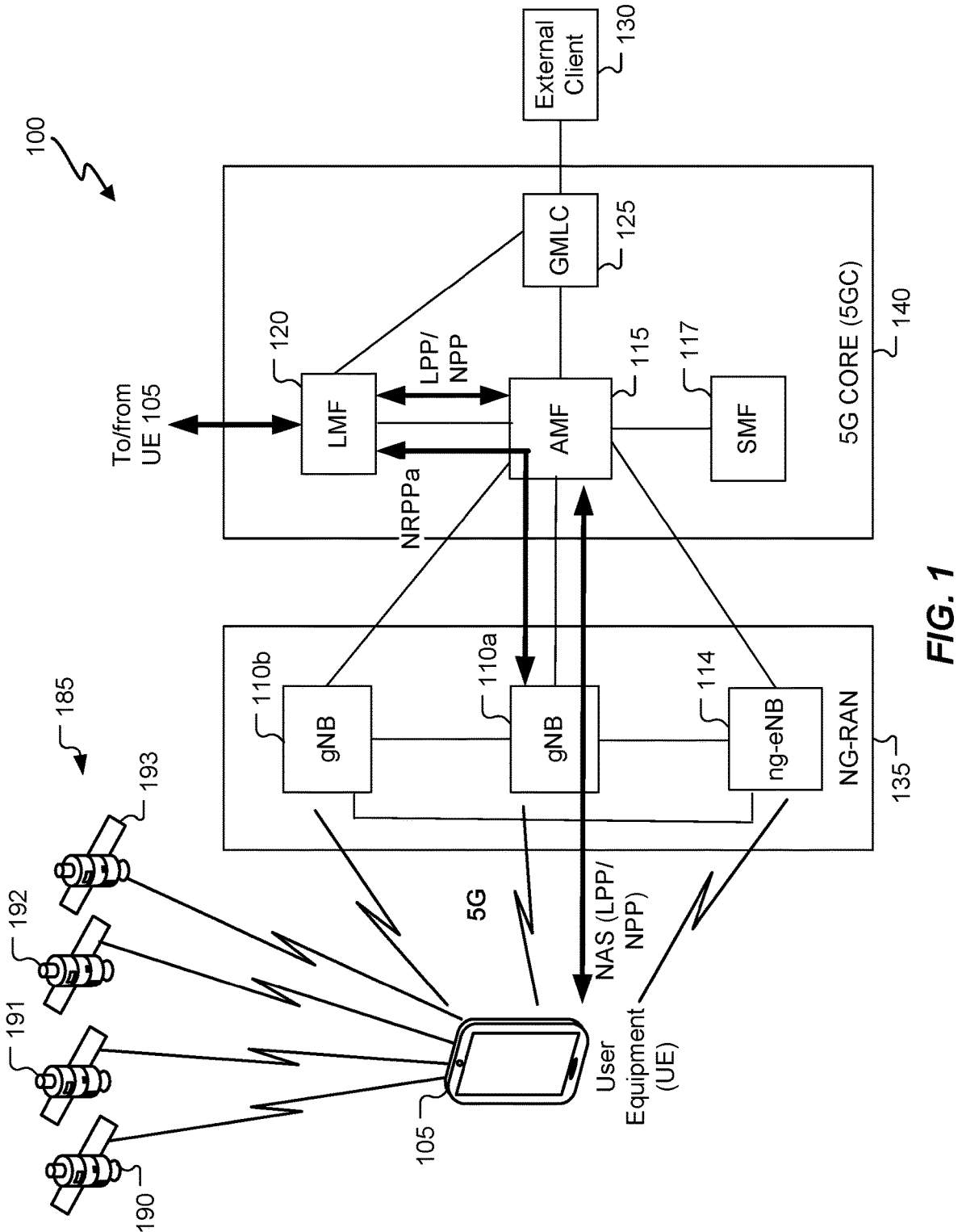
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3' Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110_a,_ 110_b,_ or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110_a,_ 110_b_ are examples and may, in various embodiments, be replaced by or include various other location server functionality and/or base station functionality respectively.

The UE 105 may comprise and/or may be referred to as a device, a mobile device, a wireless device, a wireless node, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110_a,_ 110_b,_ and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110_a_ and 110_b._ Pairs of the gNBs 110_a,_ 110_b_ in the NG-RAN 135 may be connected to one another via one or more other gNBs. Access to the 5G network is provided to the UE 105 via wireless communication between the UE 105 and one or more of the gNBs 110_a,_ 110_b,_ which may provide wireless communications access to the 5GC 140 on behalf of the UE 105 using 5G. In FIG. 1, the serving gNB for the UE 105 is assumed to be the gNB 110_a,_ although another gNB (e.g. the gNB 110_b_) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110_a,_ 110_b_ in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110_a,_ 110_b_ and/or the ng-eNB 114 may be configured to function as positioning-only beacons which may transmit signals to assist with determining the position of the UE 105 but may not receive signals from the UE 105 or from other UEs.

The BSs, such as the gNB110_a,_ gNB 110_b,_ ng-eNB 114, may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs , etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations, APs, or other wireless nodes may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-U IRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
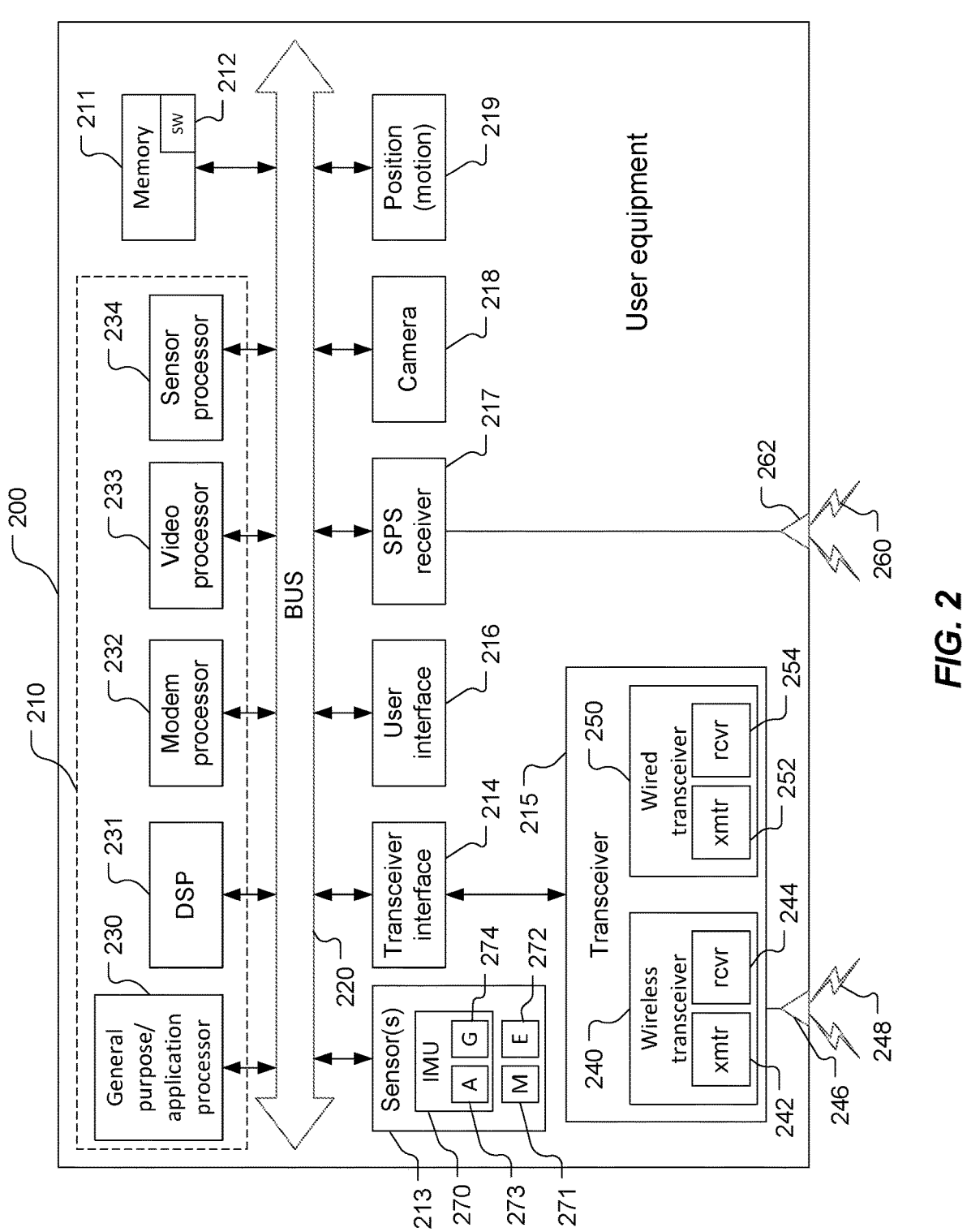
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera

218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a twodimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X) (PC5), IEEE 802.11 (including IEEE 802.11p), WiFi, WiFi Direct (WiFi-D), Bluetooth®, Zigbee etc. New Radio may use mm-wave frequencies and/or sub-6GHz frequencies. The wired transceiver 250 may include a transmitter 252 and a receiver 254 configured for wired communication, e.g., with the network 140 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-toanalog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
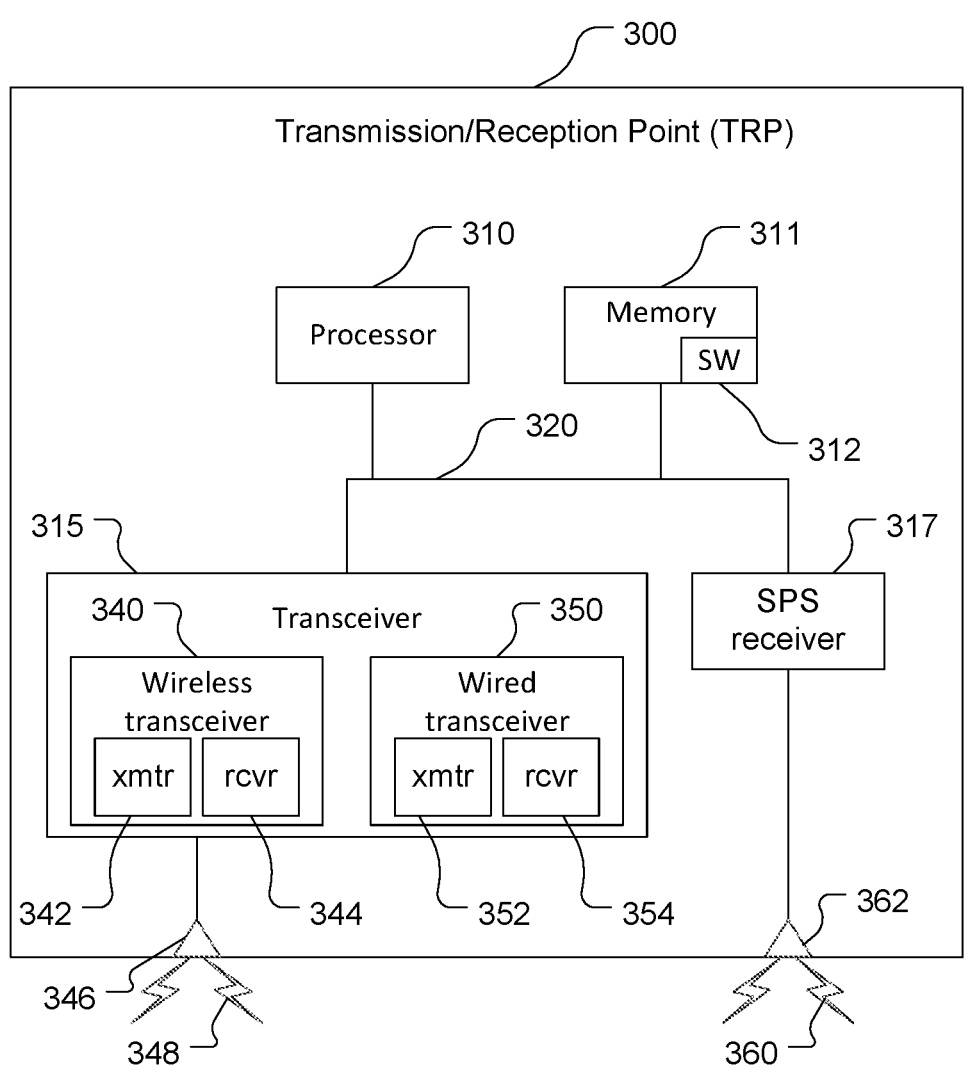
FIG. 3 is a block diagram of components of an example transmission/reception point shown in FIG. 1.

Referring also to FIG. 3, an example of a TRP 300 of the BSs, such as the gNB 110a, gNB 110b, ng-eNB 114, comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels, downlink channels, and/or sidelink channels) and/or receiving (e.g., on one or more downlink channels, uplink channels, and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by a server and/or the UE 200 (i.e., the LMF 120 and/or the UE 200 may be configured to perform one or more of these functions).

Figure 4:
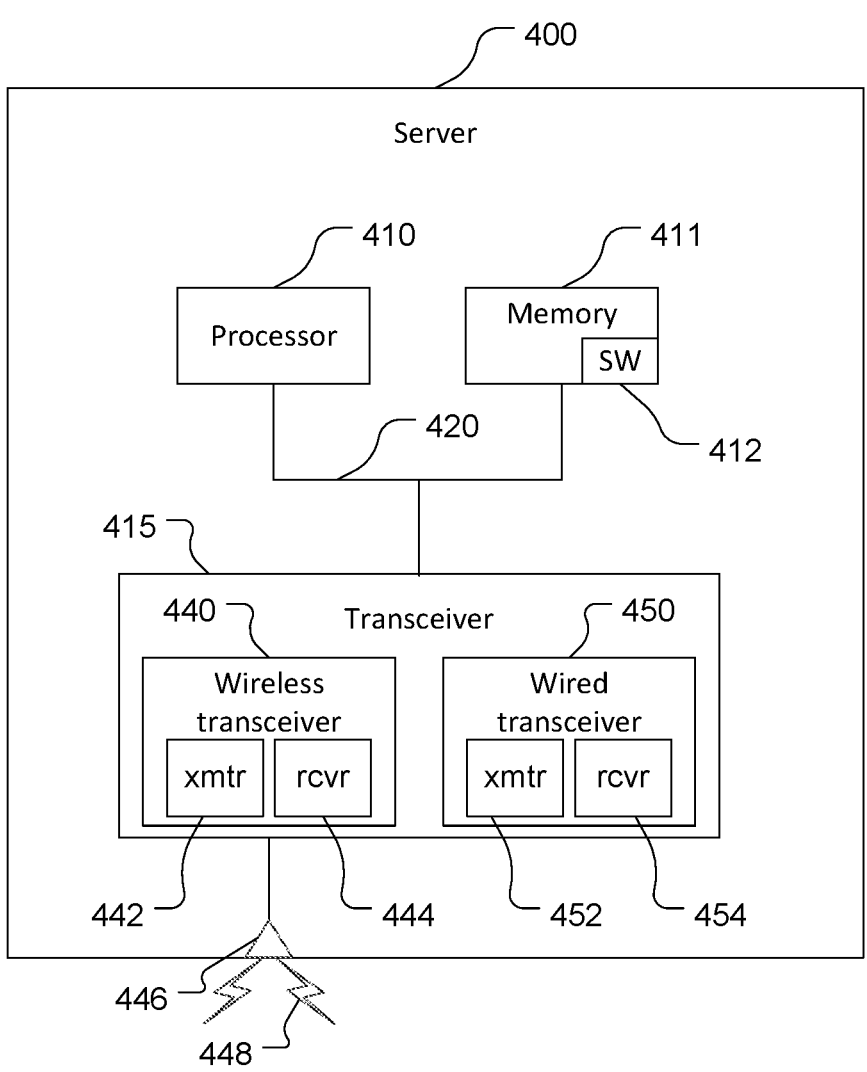
FIG. 4 is a block diagram of components of an example server shown in FIG. 1.

Referring also to FIG. 4, an example of a server 400 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 140 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

One or more of many different techniques may be used to determine position of an entity such as the UE 200. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

Figure 5:
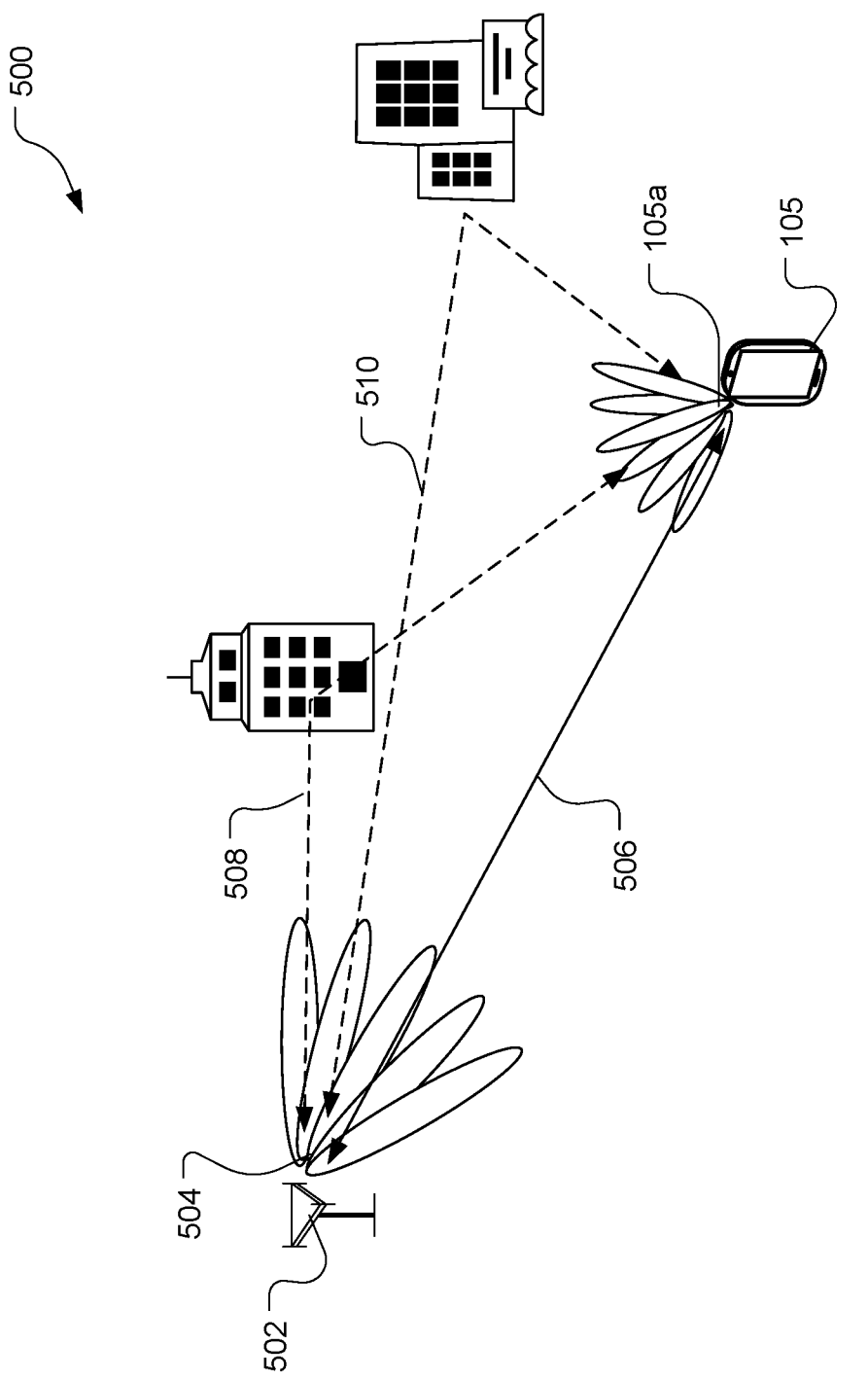
FIG. 5 is a diagram of an example line of sight between a base station and a mobile device.

Referring to FIG. 5, with further reference to FIGS. 1-4, a diagram of an example line of sight between a base station 502 and a mobile device (e.g., the UE 105) is shown. The base station may be a TRP 300 such as the gNB 110a. The base station 502 may be configured with beam forming technology to generate a plurality of transmit and/or receive beams 504. In an example, the transmit beams may comprise positioning reference signals (PRS) resources sets including a plurality of PRS resources. The transmit beams may also be other reference signals transmitted by the base station 502. The UE 105 may be a 5G NR mobile device with beam forming features and configured to generate a plurality of transmit and/or receive beams 105a. In an example, the transmit beams 105a may be sounding reference signals (SRS) transmitted from the UE 105 and received by the base station 502. In an embodiment, the base station 502 and the UE 105 may be configured for full duplex operation such that the respective transceivers 340, 240 are configured to transmit and receive simultaneously. The diagram 500 includes a simplified multi-path scenario where the base station 502 and UE 105 may communicate with one another via a LOS path 506 or one or more non-LOS (NLOS) paths such as a first NLOS path 508 and a second NOS path 510. The LOS and NLOS paths 506, 508, 510 may be based on one or more transmit beams generated by the base station 502 and the UE 105. For example, a wide transmit beam transmitted by the base station 502 may reach the UE 105 via the LOS path 506 as well as via one or more of the NLOS paths 508, 510. While the NLOS paths 508, 510 may be adequate for communications, the additional distance traveled between the base station 502 and the UE 105 may reduce the accuracy of the distance/position estimate for the UE 105. Weak LOS paths may also impact the accuracy of the position distance estimate.

Figure 6:
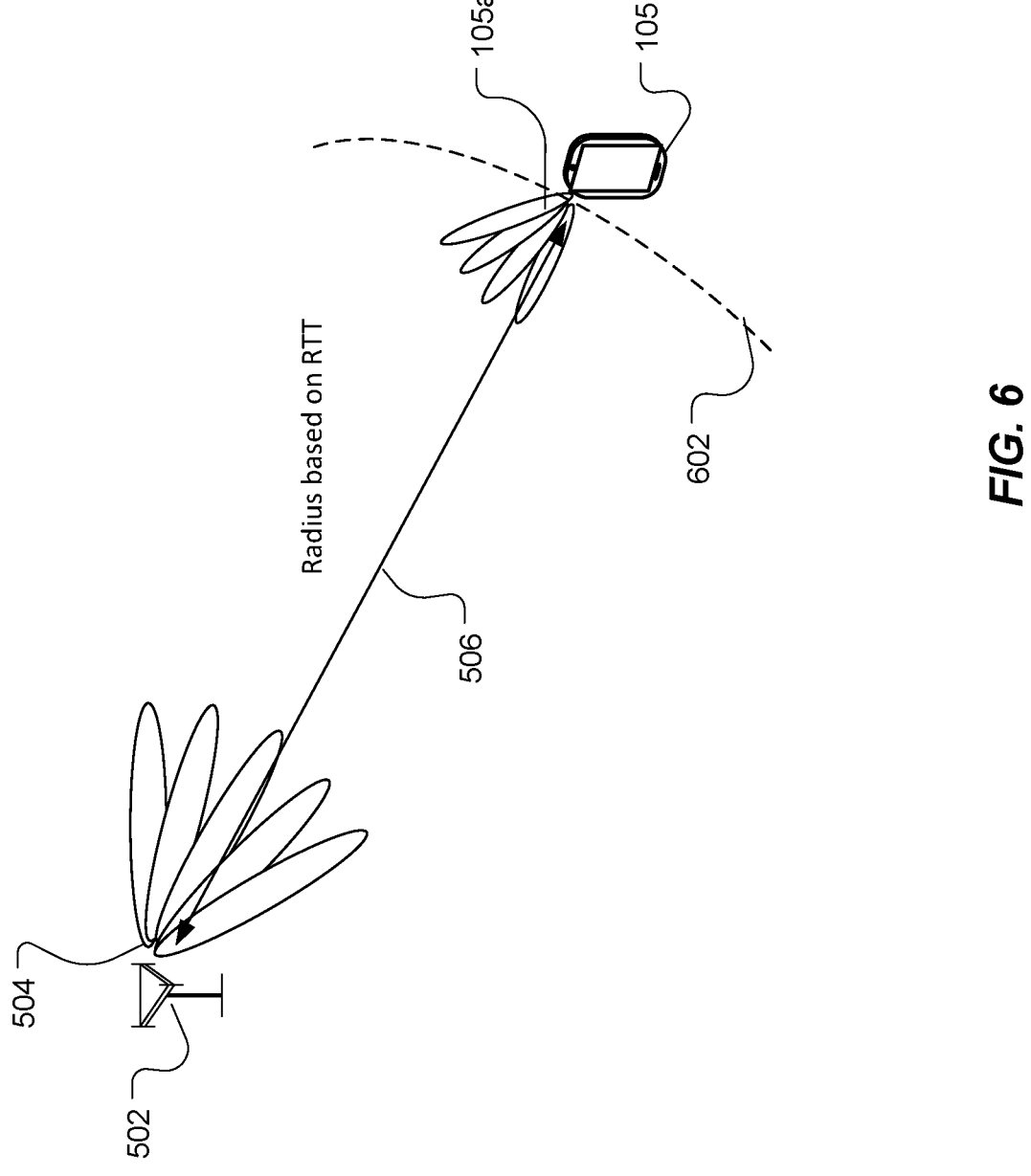
FIG. 6 is a diagram of an example position determination based on a line of sight signal.

Referring to FIG. 6, with further reference to FIG. 5, a diagram of an example position determination based on a line of sight signal is shown. LOS delay estimation is the first step in positioning for several methods such as TOA, TDOA and RTT based methods. For example, the LOS delay associated with a PRS transmitted along the LOS path 506 may be used to determine a radius of a circle 602 around the base station 502. The position of the UE 105 along the circumference of the circle 602 may be based on uplink (UL) angle of arrival (AOA) measured by the base station 502. The probability distributions described herein may be used to improve the accuracy of the position estimates based on, for example, TOA, TDOA, RTT, RSTD and/or AOA measurements.

Figure 7:
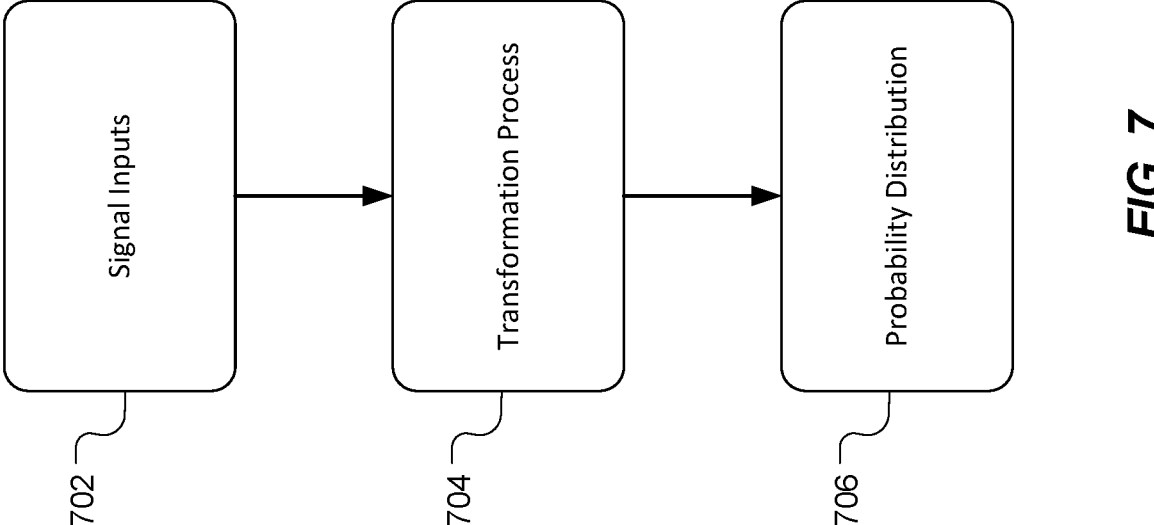
FIG. 7 is an example process for generating a probability distribution.
Figure 7:
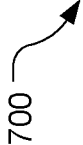

Referring to FIG. 7, an example process 700 for generating a probability distribution includes the stages shown. The process 700 may be performed on a mobile device such as the UE 200, or on a base station, such as the TRP 300. At stage 702, signal inputs may be received by a device (e.g., the UE 200 or the TRP 300). The signal inputs may be measured metrics based on reference signals such as PRS, SRS or other signals. The measured metrics may be, for example, TOA, RSTD, AOA or AOD measurements. Other sensor inputs such as from the IMU 270 and camera 218 may also be used as input. At stage 704, a transformation process may be performed on the signal inputs. In an example, the transformation process may be based on Gaussian distributions of the signal inputs. In another example, the transformation process may be based on one or more probability mass functions (PMFs) over a discrete set of bin-ranges. In another example, the transformation process may be based on sets of percentile values for a pre-defined set of percentiles. In another example, the transformation process may be a neural network. Other transformation processes may also be used to generate the probability distributions at stage 706. The device may report the probability distribution parameters based on the output of the transformation process. For example, a UE 200 may generate probability distribution parameters and report them to a base station or other network entity (e.g., the LMF 120). In another example, the TRP 300 may generate probability distribution parameters based on measurement data received from one or more UEs, or based on measured metrics for received reference signals (e.g., SRS transmitted by the UE 200).

Figure 8:
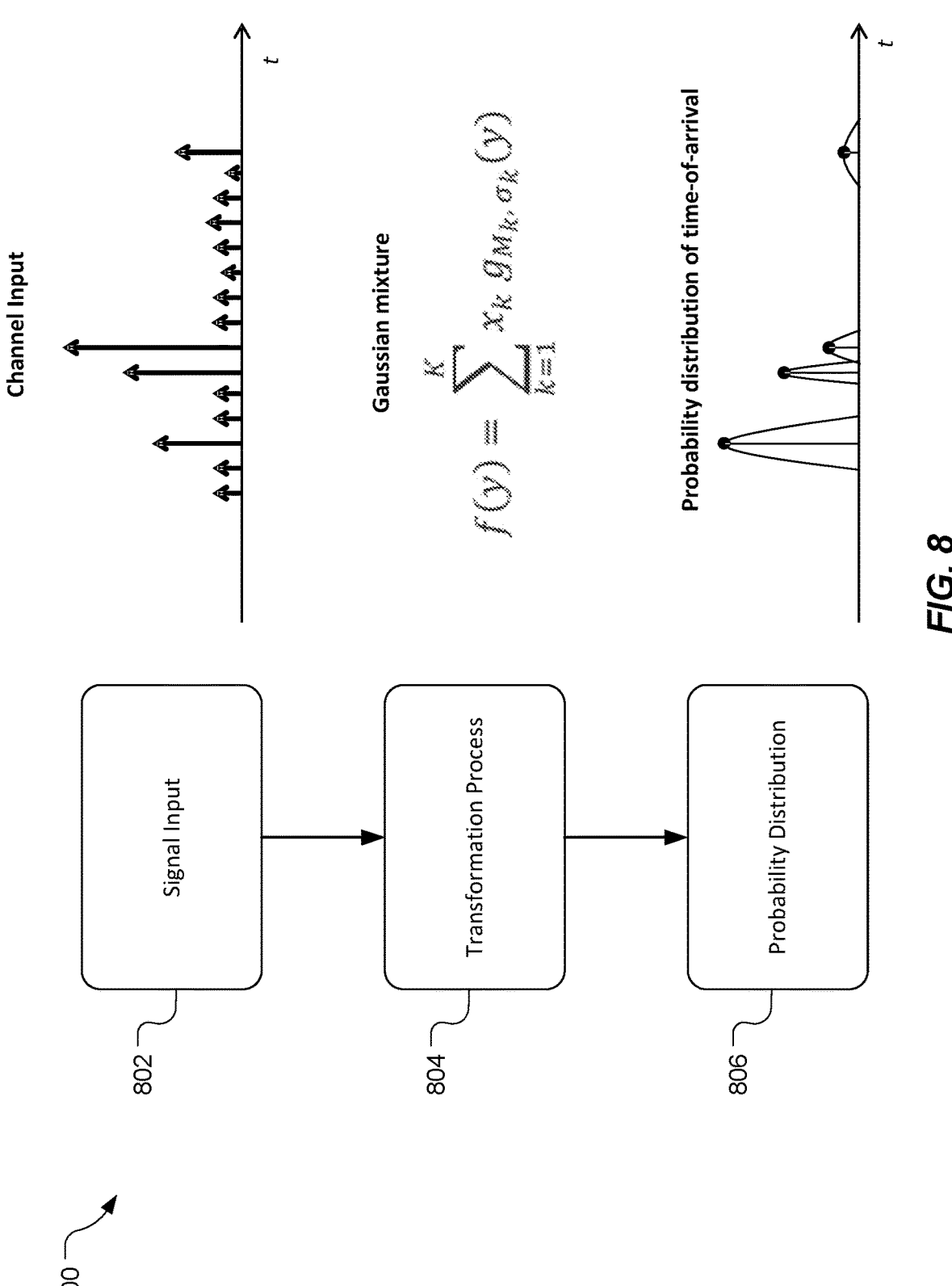
FIG. 8 is an example process for generating a probability distribution of a time of arrival.

Referring to FIG. 8, an example process 800 for generating a probability distribution for a time of arrival is shown. The UE 200 or the TRP 300 may be means for performing the process 800. In an example, one or more TRPs 300 may be configured to transmit PRSs in one or more channels and the UE 200 is configured to receive the PRS and report probability distributions for the TOA and/or RSTD of the PRS transmissions. The signal input 802, transformation process 804, and the probability distribution 806 in the process 800 are examples. Other signals transformations and probability distributions may be used.

In operation, signal input 802 may be the channel input in the wireless transceiver 240 based on the transmitted PRS. As depicted in FIG. 8, the channel input may include LOS and NLOS components (e.g., taps) with different magnitudes at different times. The transformation process 804 may be used to generate a mixture of Gaussian distributions as the probability distribution 806, and the UE 200 may report the mean, standard deviation and mixture weight of a Gaussian mixture:

$$f(y) = \sum_{k=1}^{K} x_k g_{M_k, \sigma_k}(y) \tag{1}$$

where $g_{M_k, \sigma_k}(y)$ is the probability density function (PDF) of a Gaussian random variable with mean $M_k$ and standard deviation $\sigma_k$, and $x_k$ represents the mixture weights in the Gaussian mixture distribution.

As an example, the UE 200 may convey an estimated TOA of a PRS received from the TRP 300, or the RSTD between PRS from two different TRPs. The UE 200 may be configured to report information on additional paths observed in the channel In an example, the UE 200 may convey the above parameters. The mean Mk of the $k^{th}$ Gaussian distribution may be conveyed as the RSTD value of the $k^{th}$ additional path. The standard deviation $\sigma_k$ may be conveyed in the form of the timing quality report of an additional path. The mixture weight $x_k$ may be conveyed in the form of a new element in the additional path report representing the relative confidence that the kth path is the first arrival path. The Gaussian mixture in equation (1) is an example as other transformations may be used in other implementations. In an embodiment, the confidence value based on the mixture weight $x_k$ may be reported to a network entity as a parametric representation to indicate that the $k^{th}$ path is the first arrival path (i.e., the LOS path).

In another implementation, the distribution 806 may be represented as a probability mass function (PMF) over a discrete set of bin-ranges. This representation may be derived, for example, by quantizing the original continuous distribution using a set of quantization bins. The quantization bin information may be decided by the UE 200 and signaled to the TRP 300 (e.g., gNB 110*a*) and/or the LMF 120. The quantization bin information may be decided by the TRP 300 or LMF 120 and signaled to the UE 200. For example, Radio Resource Control (RRC) signaling or higher level signaling (e.g., LPP) may be used. The quantization bins may be uniform in size or non-uniform in size. In the case of uniform bin sizes, the quantization information may comprise the size of the bin and the number of bins. For each bin, the UE 200 may report the probability of the metric value falling within the bin-range.

In another implementation, the distribution 806 may be represented as a set of percentile values for a pre-defined set of percentiles. For example, the report may include every 5th percentile of the distribution (e.g., 5th, 10th, 15th, etc.). The set of percentiles may be decided by the TRP 300 or the LMF 120 and indicated to the UE via network messaging (e.g., RRC, LPP, etc.). The set of percentiles may be decided by the UE 200 and indicated to the TRP 300 and/or LMF 120. The set of percentiles to be reported may be uniformly spaced or non-uniformly spaced. In the case of uniformly spaced bins, they may be indicated in the form of a granularity value of the spacing.

In another implementation, the parameters of the distribution 806 may be represented in the form of a neural network. The UE 200 may report the distribution by transmitting the weights of the neural network to a network entity such as the LMF 120 or other server 400 in the communication system 100. The network entity may subsequently derive the distribution by executing the computations of the neural network incorporating auxiliary inputs.

Other implementations may utilize other signals, transformations and distributions such that the UE 200 may report the distribution of the metric rather than one estimated value of the metric. A network entity may be configured to combine the distribution information with other metrics using a likelihood of fusion approach. The resulting position estimates based on the received distribution may have improved accuracy as compared to prior approaches where one estimated value is reported by the UE 200.

Figure 9:
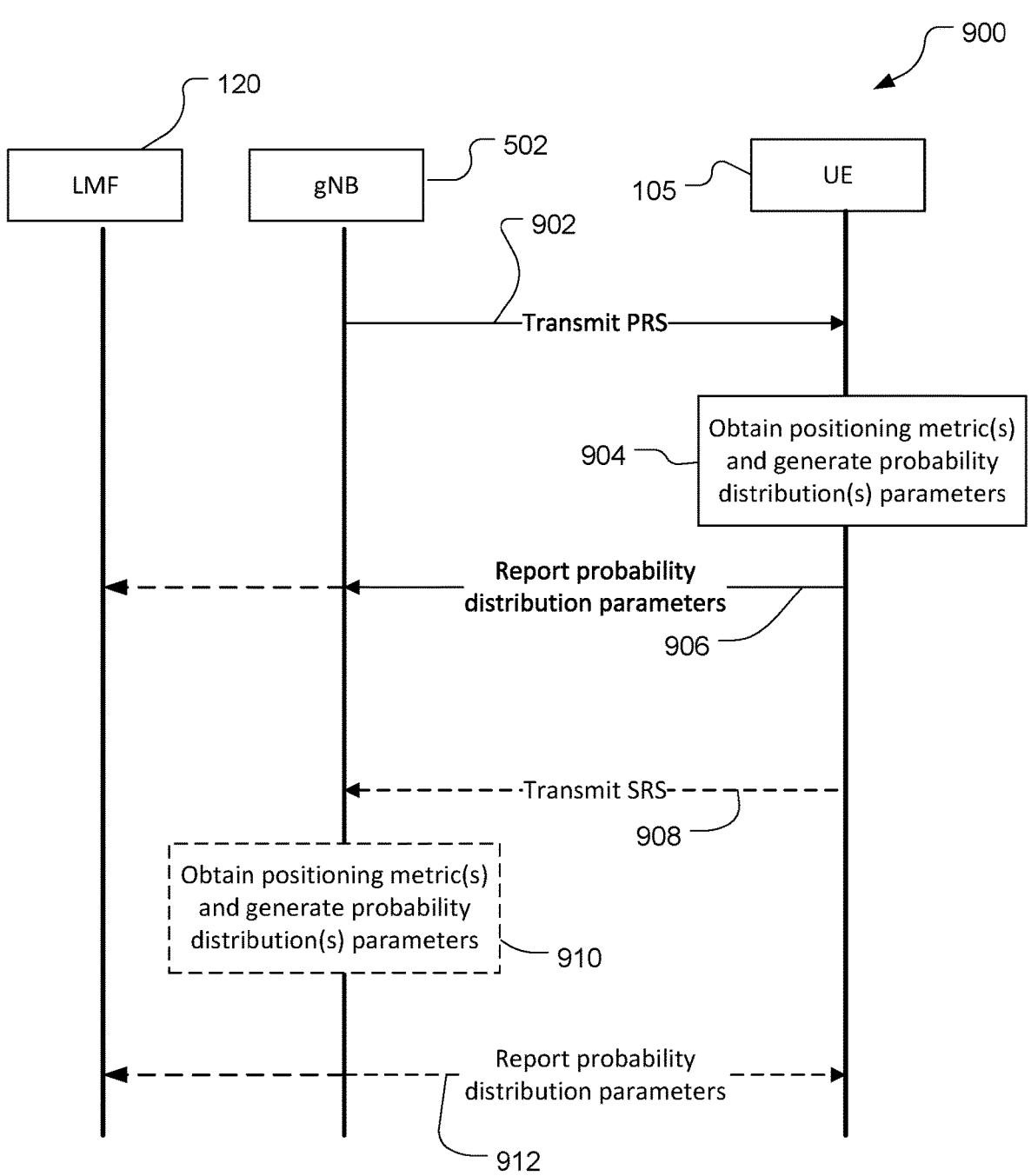
FIG. 9 includes example message flows between a base station and a mobile device for reporting probability distribution parameters.

Referring to FIG. 9, with further reference to FIG. 1-8, example message flows 900 between a base station and a mobile device for reporting probability distribution parameters is shown. The message flows 900 include a TRP 300, such as the base station 502 (e.g., a gNB) and a UE 200, such as the UE 105. While FIG. 9 depicts the use of PRS measurements, other reference signals and positioning techniques may be used. For example, the message flow 900 may include messages for RTT based positioning, and may include reference signals transmitted from other base stations. The base station 502 may be configured to transmit a PRS 902 which is received by the UE 105. At stage 904, the UE 105 may obtain one or more positioning metrics associated with the received PRS. For example, the positioning metrics may include RSSI, RSRP, RSRQ measurements of the PRS. Other metrics may also be used, such as the TOA, AOA, RSTD for the PRS (and PRS received from other stations). Positioning measurements may be obtained for the different positioning metrics (e.g., a RSRP measurement value for the RSRP metric, a AOA value for the AOA metric, etc.). Other sensor information may also be used to generate the probability distributions. For example, accelerometer and gyroscope signals may be used. Barometric pressure and light intensity (e.g., as measured by the camera 218 or other sensors) may be used. Other sensor inputs may also be used based on the configuration and capabilities of the UE 105. The probability distributions may be based on various combinations of the sensor inputs and positioning metrics. The probability distribution(s) may be based on one or more transformations such as Gaussian distributions, probability mass functions, percentile values, and neural networks. Other transformations may also be used. The UE 105 is configured to report the probability distribution parameters associated with the transformation and resulting parameters generated at stage 904. The probability distribution parameters may be the parametric representation of the transformation. The UE 105 may transmit one or more reporting messages 906 via a wireless signaling protocol such as RRC, LPP, etc. In an example, the LMF 120 may receive the probability distribution parameters from the UE 105.

In an example, the UE 105 may be configured to transmit SRSs 908 which may be received by one or more base stations, such as the base station 502. The base stations may be configured to obtain one or more positioning metrics and generate one or more distributions at stage 910. Specifically, the base stations or other network entities in the communication system 100 may be configured to perform the process 700 as previously described. The base station 502 may report the corresponding probability distribution parameters to other network entities (e.g., the LMF 120) or to the UEs in the network via one or more reporting messages 912.

Figure 10:
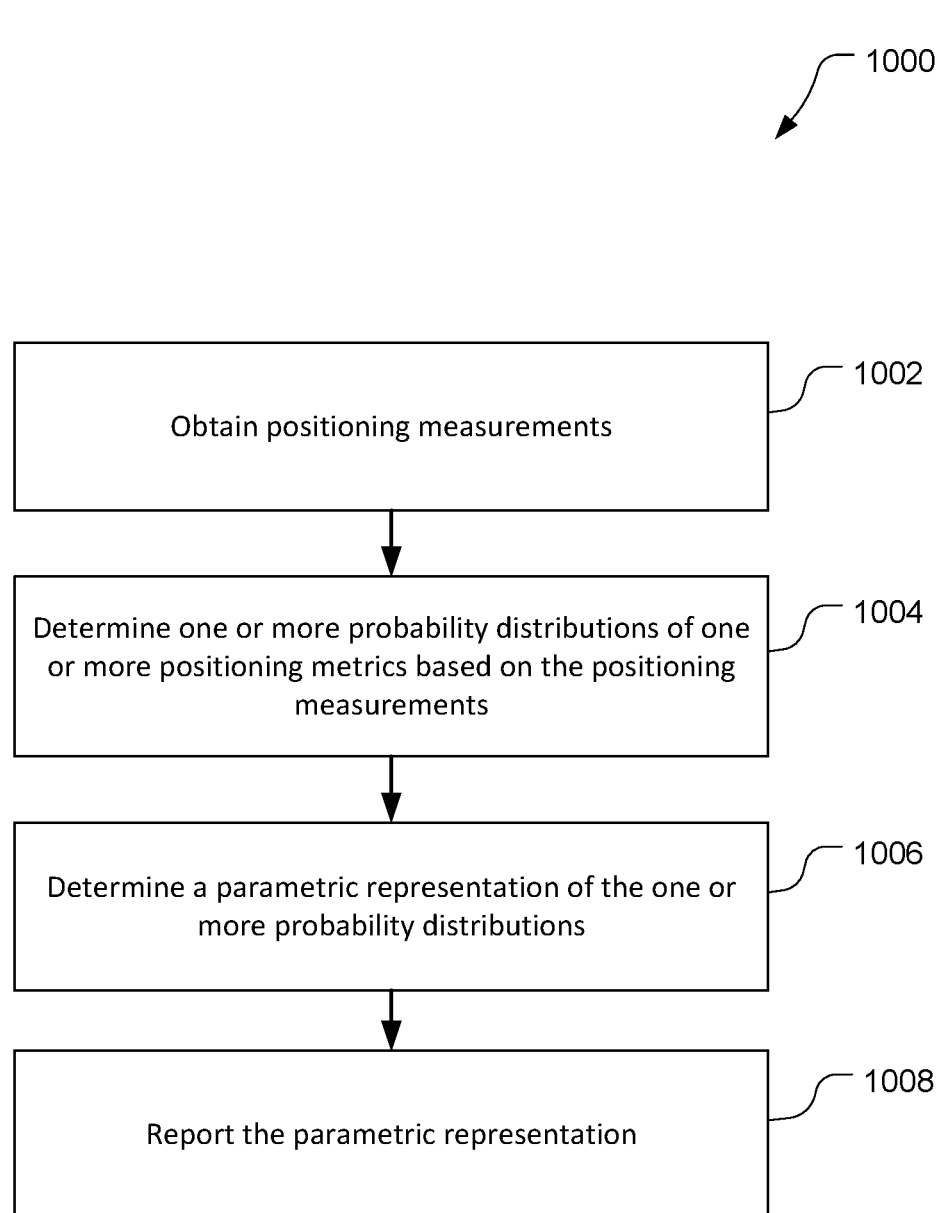
FIG. 10 is a process flow diagram for an example method for reporting probability distributions.

Referring to FIG. 10, with further reference to FIGS. 1-9, a method 1000 for reporting probability distributions includes the stages shown. The method 1000 is, however, an example and not limiting. The method 1000 may be altered, e.g., by having stages added, removed, rearranged, combined, performed concurrently, and/or having single stages split into multiple stages. The method 1000 may be performed by the UE 200, the TRP 300, and/or a server 400 in the communication system 100.

At stage 1002, the method includes obtaining positioning measurements. The UE 200 and the TRP 300 may be means for obtaining the positioning measurements. In an embodiment, a UE may report raw measurement values to a network server 400. In an example, the positioning measurements may be based on positioning metrics associated with reference signals such as RSSI, RSRP, and RSRQ values. The positioning measurements may be based on other metrics such as TOA, AOA, RTT, and RSTD values. Other positioning measurements may be based on the capabilities of the measuring device. For example, accelerometer, gyroscope, and barometer signals may be used as positioning metrics.

At stage 1004, the method includes determining one or more probability distributions of one or more positioning metrics based on the positioning measurements. The UE 200 and the TRP 300 may be means for determining the one or more probability distributions. In an example, the UE 200 or the TRP 300 may be configured to perform one or more transformations on the positioning measurements and/or corresponding metrics to generate the one or more probability distributions. The transformations may be, for example, based on Gaussian distributions, probability mass functions (PMFs), percentile values, and neural networks as previously described. In an example, the positioning measurements are associated with a first arriving path or with a second or subsequently arriving path.

At stage 1006, the method includes determining a parametric representation of the one or more probability distributions. The UE 200 and the TRP 300 are means for determining a parametric representation. The parametric representation may be, for example, the mean, standard deviation, and mixture weight of a Gaussian mixture. Other probability distributions may have different parametric representations. A PMF may be represented over a discrete set of bin-ranges. Sets of percentiles, uniformly and non-uniformly spaced, may be used. A neural network may utilize weight values as the parametric representations. The parametric representation may be a confidence value associated with a line-of-sight path (e.g., the first arrival path).

At stage 1008, the method includes reporting the parametric representation. The UE 200 and the TRP 300 are means for reporting the parametric representation. In an example, the UE 200 is configured to report the parametric representation associated with the transformation and resulting parameters generated at stage 1004. For example, the UE 200 may transmit one or more reporting messages 906 depicted in FIG. 9 via a wireless signaling protocol such as RRC, LPP, etc. Other signaling may also be used. The TRP 300 may be configured to provide the probability distributions to other network entities such as the LMF 120 or UEs within the communication system 100.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the server 400 may be performed outside of the server 400 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method of reporting a probability distribution for positioning a mobile device, comprising:
   obtaining positioning measurements;
   determining one or more probability distributions of one or more positioning metrics based on the positioning measurements;
   determining a parametric representation of the one or more probability distributions; and
   reporting the parametric representation.
2. The method of clause 1 wherein obtaining the positioning measurements includes receiving a positioning reference signal from a base station.
3. The method of clause 2 wherein the positioning measurements are associated with a first arriving path or with a second or subsequently arriving path of the positioning reference signal.
4. The method of clause 2 wherein the positioning measurements include at least one of a received signal strength indication (RSSI), a reference signal received power (RSRP), a reference signal received quality (RSRQ) and round trip signal propagation time (RTT).
5. The method of clause 2 wherein the positioning metrics include at least one of a time of arrival (TOA), a difference between a time of reception of a first positioning reference signal and a time of transmission of a second positioning reference signal, angle of arrival (AOA), and an angle of departure (AOD).
6. The method of clause 1 wherein obtaining the positioning measurements includes receiving positioning reference signals from a plurality of base stations.
7. The method of clause 6 wherein the positioning measurements are associated with a first arriving path or with a second or subsequently arriving path for each of the positioning reference signals.
8. The method of clause 6 wherein the positioning metrics include at least one of reference signal time difference (RSTD).
9. The method of clause 1 wherein the probability distribution is based at least in part on a Gaussian distribution and reporting the one or more probability distributions includes reporting a list of means, a list of standard deviations, a list of mixture weights corresponding to different Gaussians in a Gaussian mixture.
10. The method of clause 1 wherein the probability distribution is based on a probability mass function (PMF) over a discrete set of bin ranges and reporting the one or more probability distributions includes reporting a probability of a metric value falling within a bin range.
11. The method of clause 10 wherein the discrete set of bin ranges includes uniform bin sizes or non-uniform bin sizes.
12. The method of clause 1 wherein the probability distribution is based on a set of percentile values for a pre-defined set of percentiles and reporting the one or more probability distributions includes reporting a uniformly spaced set of percentiles or a non-uniformly spaced set of percentiles.
13. The method of clause 1 wherein the probability distribution is based on a neural network and reporting the one or more probability distributions includes transmitting one or more weights of the neural network.
14. The method of clause 1 wherein obtaining the positioning measurements includes receiving sounding reference signals from one or more mobile devices.
15. The method of clause 1 wherein the parametric representation is reported to a base station and/or a location server.
16. The method of clause 1 wherein the parametric representation is reported to the mobile device.
17. The method of clause 1 wherein the parametric representation includes a confidence value associated with a line-of-sight path.
18. The method of clause 1 wherein obtaining the positioning measurements includes receiving a plurality of different positioning measurements and the probability distribution is a joint distribution based on the plurality of different positioning measurements.
19. The method of clause 1 wherein obtaining the positioning measurements includes receiving a plurality of positioning measurements from a wireless node, and the probability distribution is a joint distribution of a plurality positioning metrics based on the plurality of positioning measurements.
20. The method of clause 19 wherein the plurality of positioning measurements includes a time of arrival and an angle of arrival for a positioning reference signal, and the joint distribution is based on the time of arrival and the angle of arrival.
21. The method of clause 1 wherein reporting the parametric representation includes transmitting the parametric representation in one or more radio resource control messages, LPP messages, or NPP messages.

22. The method of clause 1 further comprising determining a position of the mobile device based at least in part on the one or more probability distributions.

23. The method of clause 1 wherein obtaining the positioning measurements includes receiving a signal from at least one of an accelerometer, a gyroscope, and a barometer.

24. The method of clause 1 further comprising:
    determining statistics associated with the one or more probability distributions; and
    reporting the statistics.

25. The method of clause 24 wherein the statistics include one or more of a mean, a standard deviation, a percentile, and a confidence interval.

26. An apparatus, comprising:
    a memory;
    at least one transceiver;
    at least one processor communicatively coupled to the memory and the at least one transceiver and configured to:
    obtain positioning measurements;
    determine one or more probability distributions of one or more positioning metrics based on the positioning measurements;
    determine a parametric representation of the one or more probability distributions; and
    reporting the parametric representation.

27. The apparatus of clause 26 wherein the at least one processor is further configured to receive a positioning reference signal from a base station.

28. The apparatus of clause 27 wherein the positioning measurements are associated with a first arriving path or with a second or subsequently arriving path of the positioning reference signal.

29. The apparatus of clause 27 wherein the positioning measurements include at least one of a received signal strength indication (RSSI), a reference signal received power (RSRP), a reference signal received quality (RSRQ) and round trip signal propagation time (RTT).

30. The apparatus of clause 27 wherein the positioning metrics include at least one of a time of arrival (TOA), a difference between a time of reception of a first positioning reference signal and a time of transmission of a second positioning reference signal, angle of arrival (AOA), and an angle of departure (AOD).

31. The apparatus of clause 26 wherein the at least one processor is further configured to receive positioning reference signals from a plurality of base stations.

32. The apparatus of clause 31 wherein the positioning measurements are associated with a first arriving path or with a second or subsequently arriving path for each of the positioning reference signals.

33. The apparatus of clause 31 wherein the positioning metrics include at least one of reference signal time difference (RSTD).

34. The apparatus of clause 26 wherein the probability distribution is based at least in part on a Gaussian distribution and the at least one processor is configured to report a list of means, a list of standard deviations, a list of mixture weights corresponding to different Gaussians in a Gaussian mixture.

35. The apparatus of clause 26 wherein the probability distribution is based on a probability mass function (PMF) over a discrete set of bin ranges and the at least one processor is configured to report a probability of a metric value falling within a bin range.

36. The apparatus of clause 35 wherein the discrete set of bin ranges includes uniform bin sizes or non-uniform bin sizes.

37. The apparatus of clause 26 wherein the probability distribution is based on a set of percentile values for a pre-defined set of percentiles and the at least one processor is configured to report a uniformly spaced set of percentiles or a non-uniformly spaced set of percentiles.

38. The apparatus of clause 26 wherein the probability distribution is based on a neural network and the at least one processor is configured to transmit one or more weights of the neural network.

39. The apparatus of clause 26 wherein the at least one processor is configured to receive sounding reference signals from one or more mobile devices.

40. The apparatus of clause 26 wherein the parametric representation is reported to a base station.

41. The apparatus of clause 26 wherein the parametric representation is reported to a location server.

42. The apparatus of clause 26 wherein the parametric representation is reported to the mobile device.

43. The apparatus of clause 26 wherein the at least one processor is configured to receive a plurality of different positioning measurements and the probability distribution is a joint distribution based on the plurality of different positioning measurements.

44. The apparatus of clause 26 wherein the at least one processor is configured to receive a plurality of positioning measurements from a wireless node, and the probability distribution is a joint distribution of a plurality positioning metrics based on the plurality of positioning measurements.

45. The apparatus of clause 44 wherein the plurality of positioning measurements includes a time of arrival and an angle of arrival for a positioning reference signal, and the joint distribution is based on the time of arrival and the angle of arrival.

46. The apparatus of clause 26 wherein the at least one processor is configured to transmit the parametric representation in one or more radio resource control messages, LPP messages, or NPP messages.

47. The apparatus of clause 26 wherein the at least one processor is configured to determine a position of the mobile device based at least in part on the one or more probability distributions.

48. The apparatus of clause 26 wherein the at least one processor is configured to receive a signal from at least one of an accelerometer, a gyroscope, and a barometer.

49. The apparatus of clause 26 wherein the at least one processor is configured to:
    determine statistics associated with the one or more probability distributions; and
    report the statistics.

50. The apparatus of clause 49 wherein the statistics include one or more of a mean, a standard deviation, a percentile, and a confidence interval.

51. An apparatus for reporting a probability distribution for positioning a mobile device, comprising:
    means for obtaining positioning measurements;
    means for determining one or more probability distributions of one or more positioning metrics based on the positioning measurements;
    means for determining a parametric representation of the one or more probability distributions; and
    means for reporting the parametric representation.

52. A non-transitory processor-readable storage medium comprising processor-readable instructions configured to cause one or more processors to report a probability distribution for positioning a mobile device, comprising code for:

obtaining positioning measurements;

determining one or more probability distributions of one or more positioning metrics based on the positioning measurements;

determining a parametric representation of the one or more probability distributions; and reporting the parametric representation.

The invention claimed is:

1. A method of reporting a probability distribution for positioning a mobile device, comprising:

obtaining positioning measurements, including receiving a positioning reference signal from a base station or receiving positioning reference signals from a plurality of base stations or receiving the positioning measurements from a user equipment;

obtaining sensor information;

determining one or more probability distributions of one or more positioning metrics based on the positioning measurements and the sensor information;

determining one or more parametric representations of the one or more probability distributions, the one or more parametric representations including parameters indicating one or more weights of a neural network for a corresponding probability distribution; and reporting the one or more parametric representations, wherein the positioning metrics include at least one of a time of arrival (TOA), a difference between a time of reception of a first positioning reference signal and a time of transmission of a second positioning reference signal, an angle of arrival (AOA), an angle of departure (AOD), or any combination thereof.

2. The method of claim 1 wherein obtaining the positioning measurements includes receiving the positioning reference signal from the base station and wherein the positioning measurements are associated with a first arriving path or with a second or subsequently arriving path of the positioning reference signal.

3. The method of claim 1 wherein obtaining the positioning measurements includes receiving the positioning reference signal from the base station and wherein the positioning measurements include at least one of a received signal strength indication (RSSI), a reference signal received power (RSRP), a reference signal received quality (RSRQ) and round trip signal propagation time (RTT).

4. The method of claim 1 wherein obtaining the positioning measurements includes receiving the positioning reference signal from the base station and wherein the positioning measurements are associated with a first arriving path or with a second or subsequently arriving path for each of the positioning reference signals.

5. The method of claim 1 wherein obtaining the positioning measurements includes receiving the positioning reference signal from the base station and wherein the positioning metrics include at least one of reference signal time difference (RSTD).

6. The method of claim 1 wherein the one or more parametric representations further include parameters indicating a mixture of Gaussian distributions for a corresponding probability distribution and reporting the one or more parametric representations includes reporting a list of means, a list of standard deviations, and a list of mixture weights corresponding to different Gaussian distributions in the mixture of Gaussian distributions.

7. The method of claim 1 wherein the one or more probability distributions are based on a probability mass function (PMF) over a discrete set of bin ranges and reporting the one or more parametric representations includes reporting a probability of a metric value falling within each of the bin ranges.

8. The method of claim 7 wherein the discrete set of bin ranges includes uniform bin sizes or non-uniform bin sizes.

9. The method of claim 1 wherein the one or more parametric representations further include a set of percentile values for a pre-defined set of percentiles and reporting the one or more parametric representations includes reporting a uniformly spaced set of percentiles or a non-uniformly spaced set of percentiles.

10. The method of claim 1 wherein reporting the one or more parametric representations includes transmitting one or more weights of the neural network for each of the one or more probability distributions.

11. The method of claim 1 wherein obtaining the positioning measurements includes receiving sounding reference signals from one or more mobile devices.

12. The method of claim 1 wherein obtaining the positioning measurements includes receiving a plurality of different positioning measurements and the one or more probability distributions include a joint distribution based on the plurality of different positioning measurements and the sensor information.

13. The method of claim 1 wherein obtaining the positioning measurements includes receiving a plurality of positioning measurements from a wireless node, and the one or more probability distributions include a joint distribution of a plurality positioning metrics based on the plurality of positioning measurements and the sensor information.

14. The method of claim 13 wherein the plurality of positioning measurements includes a time of arrival and an angle of arrival for a positioning reference signal, and the joint distribution is based on the time of arrival and the angle of arrival.

15. An apparatus, comprising:

a memory;

at least one transceiver;

at least one processor communicatively coupled to the memory and the at least one transceiver, and configured to:

obtain positioning measurements by at least one of receiving, via the at least one transceiver, a positioning reference signal from a base station or receiving positioning reference signals from a plurality of base stations or receiving the positioning measurements from a user equipment;

obtain sensor information;

determine one or more probability distributions of one or more positioning metrics based on the positioning measurements and the sensor information;

determine one or more parametric representations of the one or more probability distributions, the one or more parametric representations including parameters indicating one or more weights of a neural network for a corresponding probability distribution; and report the one or more parametric representations, wherein the positioning metrics include at least one of a time of arrival (TOA), a difference between a time of reception of a first positioning reference signal and a time of transmission of a second positioning reference signal, an angle of arrival (AOA), an angle of departure (AOD), or any combination thereof.

16. The apparatus of claim 15 wherein to obtain the positioning measurements the at least one processor is configured to receive the positioning reference signal from the base station and wherein the positioning measurements are associated with a first arriving path or with a second or subsequently arriving path of the positioning reference signal.

17. The apparatus of claim 15 wherein to obtain the positioning measurements the at least one processor is configured to receive the positioning reference signal from the base station and wherein the positioning measurements include at least one of a received signal strength indication (RSSI), a reference signal received power (RSRP), a reference signal received quality (RSRQ) and round trip signal propagation time (RTT).

18. The apparatus of claim 15 wherein to obtain the positioning measurements the at least one processor is configured to receive the positioning reference signals from the plurality of base stations and wherein the positioning measurements are associated with a first arriving path or with a second or subsequently arriving path for each of the positioning reference signals.

19. The apparatus of claim 15 wherein to obtain the positioning measurements the at least one processor is configured to receive the positioning reference signals from the plurality of base stations and wherein the positioning metrics include at least one of reference signal time difference (RSTD).

20. The apparatus of claim 15 wherein the one or more probability distributions include a Gaussian distribution, the one or more parametric representations further include parameters indicating a mixture of Gaussian distributions for a corresponding probability distribution, and the at least one processor is configured to report a list of means, a list of standard deviations, and a list of mixture weights corresponding to different Gaussian distributions in the mixture of Gaussian distributions.

21. The apparatus of claim 15 wherein the one or more probability distributions include a probability mass function (PMF) over a discrete set of bin ranges and the at least one processor is configured to report a probability of a metric value falling within each of the bin ranges.

22. The apparatus of claim 15 wherein the at least one processor is configured to report the one or more parametric representations via the at least one transceiver to a location management function.

23. An apparatus for reporting a probability distribution for positioning a mobile device, comprising:

means for obtaining positioning measurements, including at least one of means for receiving a positioning reference signal from a base station or means for receiving positioning reference signals from a plurality of base stations or means for receiving the positioning measurements from a user equipment;

means for obtaining sensor information;

means for determining one or more probability distributions of one or more positioning metrics based on the positioning measurements and the sensor information;

means for determining one or more parametric representations of the one or more probability distributions, the one or more parametric representations including parameters indicating one or more weights of a neural network for a corresponding probability distribution; and means for reporting the one or more parametric representations, wherein the positioning metrics include at least one of a time of arrival (TOA), a difference between a time of reception of a first positioning reference signal and a time of transmission of a second positioning reference signal, an angle of arrival (AOA), an angle of departure (AOD), or any combination thereof.

24. A non-transitory processor-readable storage medium comprising processor-readable instructions configured to cause one or more processors to report a probability distribution for positioning a mobile device, comprising code for:

obtaining positioning measurements by at least one receiving a positioning reference signal from a base station or means for receiving positioning reference signals from a plurality of base stations or means for receiving the positioning measurements from a user equipment;

obtaining sensor information;

determining one or more probability distributions of one or more positioning metrics based on the positioning measurements and the sensor information;

determining one or more parametric representations of the one or more probability distributions, the one or more parametric representations including parameters indicating one or more weights of a neural network for a corresponding probability distribution; and reporting the one or more parametric representations, wherein the positioning metrics include at least one of a time of arrival (TOA), a difference between a time of reception of a first positioning reference signal and a time of transmission of a second positioning reference signal, an angle of arrival (AOA), an angle of departure (AOD), or any combination thereof.

* * * * *